(12) United States Patent
Hansen

(10) Patent No.: US 7,442,137 B2
(45) Date of Patent: Oct. 28, 2008

(54) ECCENTRIC MOUNTING AND ADJUSTMENT SYSTEM FOR BELT DRIVEN DEVICES

(75) Inventor: David N. Hansen, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 737 days.

(21) Appl. No.: 11/094,549

(22) Filed: Mar. 28, 2005

(65) Prior Publication Data

US 2006/0217221 A1 Sep. 28, 2006

(51) Int. Cl.
*F16H 7/08* (2006.01)
*F16H 7/22* (2006.01)
(52) U.S. Cl. .................. 474/101; 474/70; 474/112; 474/135; 74/527; 74/575; 385/56

(58) Field of Classification Search ......... 474/101–138, 474/70; 74/527, 575; 123/195 A; 188/82.1, 188/82.7; 192/43.1, 43.2; *F16H 7/08, 7/22*
See application file for complete search history.

(56) References Cited

U.S. PATENT DOCUMENTS

| | | | | |
|---|---|---|---|---|
| 5,590,228 A | * | 12/1996 | Gibola et al. | ............... 385/56 |
| 2003/0066593 A1 | * | 4/2003 | Kopelowicz | ............... 156/229 |
| 2004/0185976 A1 | * | 9/2004 | Meckstroth et al. | ......... 474/101 |

* cited by examiner

*Primary Examiner*—Lynda Jasmin
*Assistant Examiner*—Robert T Reese
(74) *Attorney, Agent, or Firm*—David L. Kuhn; Thomas W. Saur; Luis Miguel Acosta

(57) ABSTRACT

An eccentric adjustment and mounting system is useful for belt engaging engine components such as alternators or water pumps. The system includes a housing fixed to the engine, a socket rotatable in pawl-and-ratchet fashion within the housing, and a socket aperture eccentrically disposed relative to the socket's axis. The aperture receives the belt engaging component, whereby rotation of the socket moves the component to adjust belt tension.

5 Claims, 5 Drawing Sheets

ECCENTRIC MOUNTING AND ADJUSTMENT SYSTEM FOR BELT DRIVEN DEVICES

GOVERNMENT INTEREST

The invention described herein may be made, used, and licensed by, or for, the United States Government for governmental purposes without paying me any royalty.

BACKGROUND AND SUMMARY

The present invention relates to an eccentric mounting and adjustment (EMA) system for belt driving or belt driven devices that are installed and operated within the restricted confines of an engine compartment, typically a motor vehicle. It satisfies two essential requirements for automotive devices driven by an endless flexible belt. These are: 1) a reliable mounting to the engine block assembly, and 2) a continuous provision of a proper amount of tension to the belt for either driving or driven devices. As a result, there is minimal wear and tear on device bearings and the belt, which reduces operational failures and assures maximum efficiency for these devices.

The term "belt driven device" includes those devices within motor vehicles that are serviced by endless belts, such as power steering pumps, air compressors, water pumps, generators, alternators, cooling fans, sheaves, idlers, pulleys, water extraction and recycle systems, and other ancillary devices customarily used by motor vehicles with internal combustion engines. A drive device is one that is directly connected to an output shaft of said engine and uses a flexible endless belt to drive at least one driven device, such as an alternator.

Further, a mechanic must avoid accidents while working in the restricted confines of an engine compartment to avoid any mishap to himself or to sensitive engine components. Such accidents could potentially disrupt or disable hydraulic, electrical, and mechanical systems located therein. Also, the mechanic or operator must perform all installation, adjustment, and removal work very quickly with minimal efforts and support in either the field or the shop. Finally, uncomfortable or awkward positions while working should be avoided to avoid personal injury.

My invention allows any flexible belt of the armed forces' inventory to be readily removable, installable, and adjustable by a single person using the simplest of tools, such as a large screwdriver, a pair of pliers, or an elongated rod of about ½ inch in diameter. Thereby, I have avoided former frustrations and expenses involving special tools or fasteners, which can be lost or misplaced. Moreover, minimal force and exertion are expended.

Furthermore, this invention does not significantly modify or depart from standard procedures currently used by motor pools for maintaining belts, drives, and driven devices. For example, electrical connections are easily made by using a simple bayonet or coaxial connector that, in form, resembles the ends of modern "jumper cables" employed by the US Military, such that positive and negative poles are axially symmetric. Similarly, connections for mechanical or hydraulic systems are just as easily made by conventional methods at the rear of my invention.

It is to be understood that the readiness requirements for military vehicles are unusual, and thereby necessitate more reliable and rugged designs than their commercial counterparts. The components must have a good tolerance for more frequent shocks, vibrations, and thermal events because they frequently go from prolonged periods at standing idle to wide open cross-country travel. Further, present art approaches have the potential for reducing readiness, increasing maintenance frequency and costs, as well as exposing personnel to undue risks to reattach or tension belts while engaged in awkward positions or extreme reaches.

For military vehicles, belt performance is critical with regard to the tension that is maintained on them. With use, the belts can become loose and full torque is not easily transmitted to the driven devices. Thereafter, the belts can slip and become more damaged. If the belts are too tight, excessive wear can result in the bearing assemblies of the driving or driven devices as well as causing belt shredding or separation. This impacts operating efficiency.

It is therefore an object of this invention to provide an EMA system that properly tensions an endless drive belt. It is a separate object to provide such a system that requires less manual force and effort while installing, tensioning, and operating. It is another object to provide a functional EMA system that is mechanically durable, economical to produce, reliable in construction, simple to manufacture, and capable of achieving a long or trouble free service life.

These and other objects, features, and advantages of this invention will be apparent to those skilled in the relevant arts upon a full reading of this specification and the appended claims which explain and define the aspects and principals of this invention.

DETAILED DESCRIPTION

Figure 1:
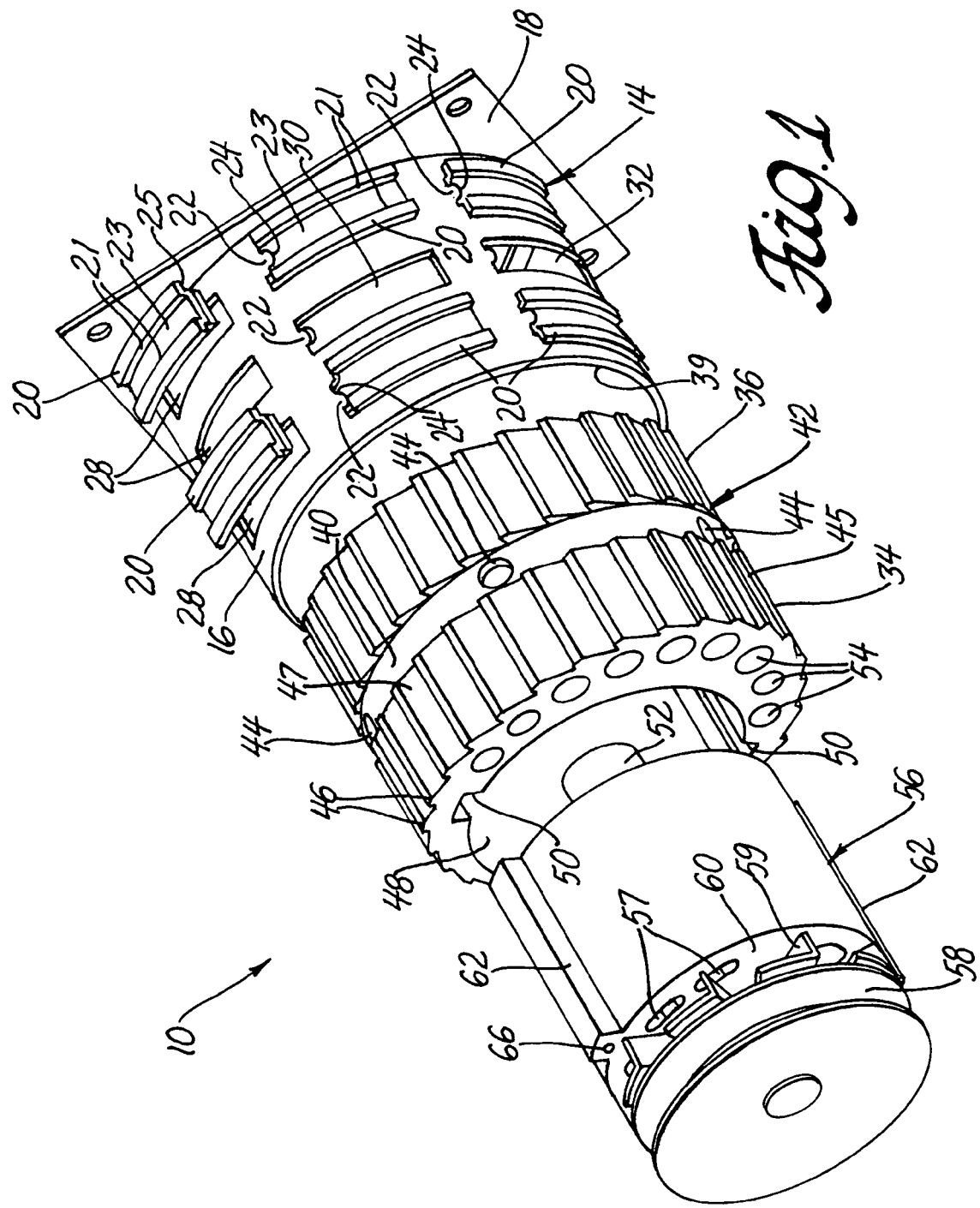
FIG. 1 is an exploded perspective view of the eccentric mounting and assembly system of the present invention.
Figure 4:
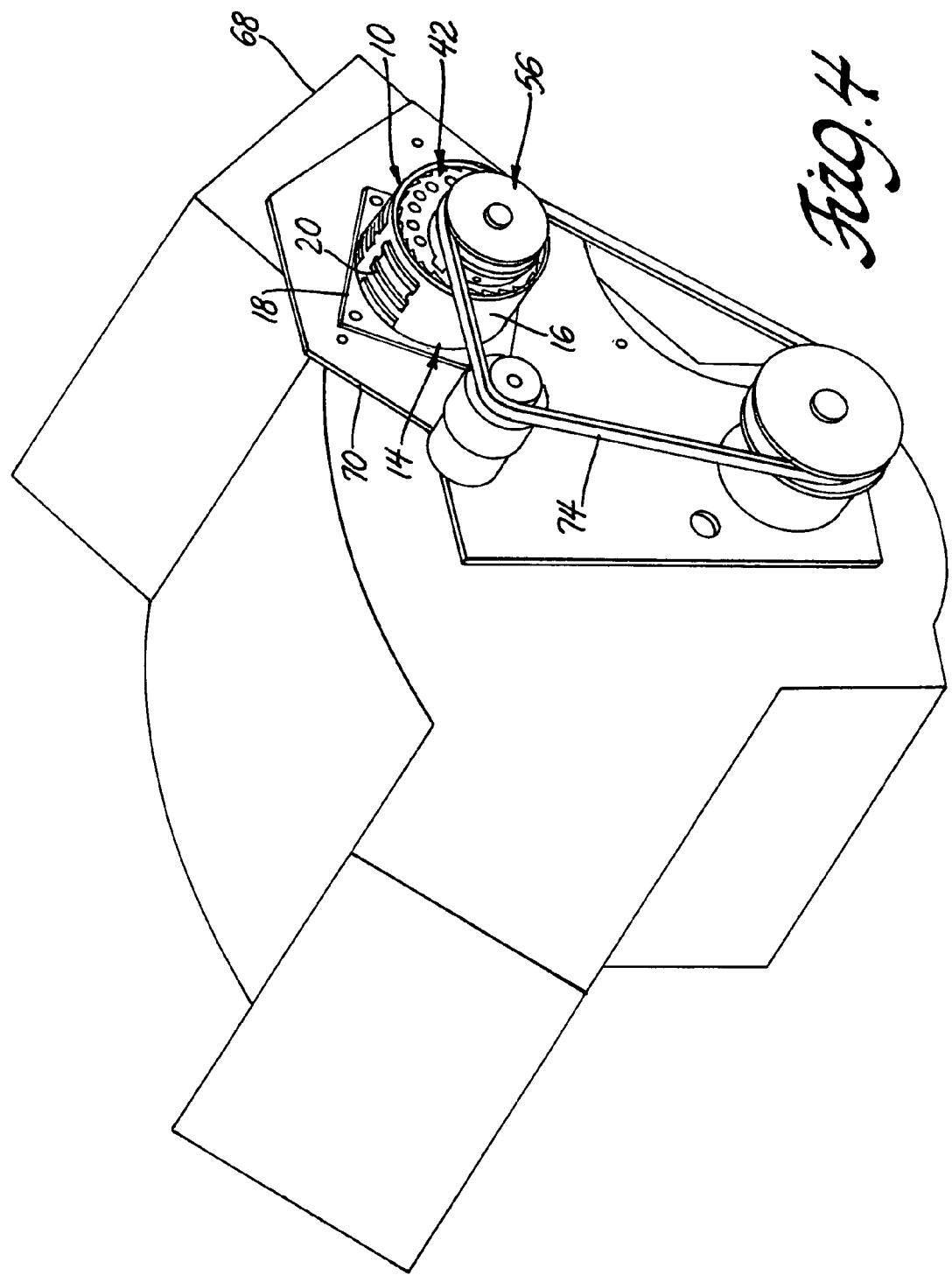
FIG. 4 is a perspective view of the present invention mounted to an engine block assembly.

FIG. 1 depicts an eccentric mounting and assembly system 10. FIG. 4 shows a typical mounting of system 10 to a plate 70 on the engine block 68, wherein the assembly is affixed to plate 70 by bolts passing through the system's rectangular base 18. Plate 70 can be spaced from the engine block to allow clearance for electrical or fluid conduits passing from driven a device 56 through base 18. An endless drive belt 74 rotates driven device 56 in conventional fashion. Besides device 56, system 10 includes an eccentric socket 42 and a housing member 14.

Returning to FIG. 1, device 56 fits within receiving aperture 48 of socket 42, which preferably is fashioned of a high-strength, heat resistant, non-metallic material. Device 56 is non-rotatably seated in socket 42 by the shape of the socket, or by alternate means, such as axial fixation within the socket by the use of wedges, lugs, flats, or pins. For instance, at least one lug 62 that extends outwardly from the circular surface of driven device 56 could be slidingly inserted within a conforming slot 50 of the internal wall of the eccentric socket 42. Optionally, lug 62 and slot 50 can be angled so they effectively have a slightly spiraled or threaded engagement, such that rotation force exerted on device 56 by a drive belt screws the device into socket 42, thereby seating the device in the socket.

Figure 2:
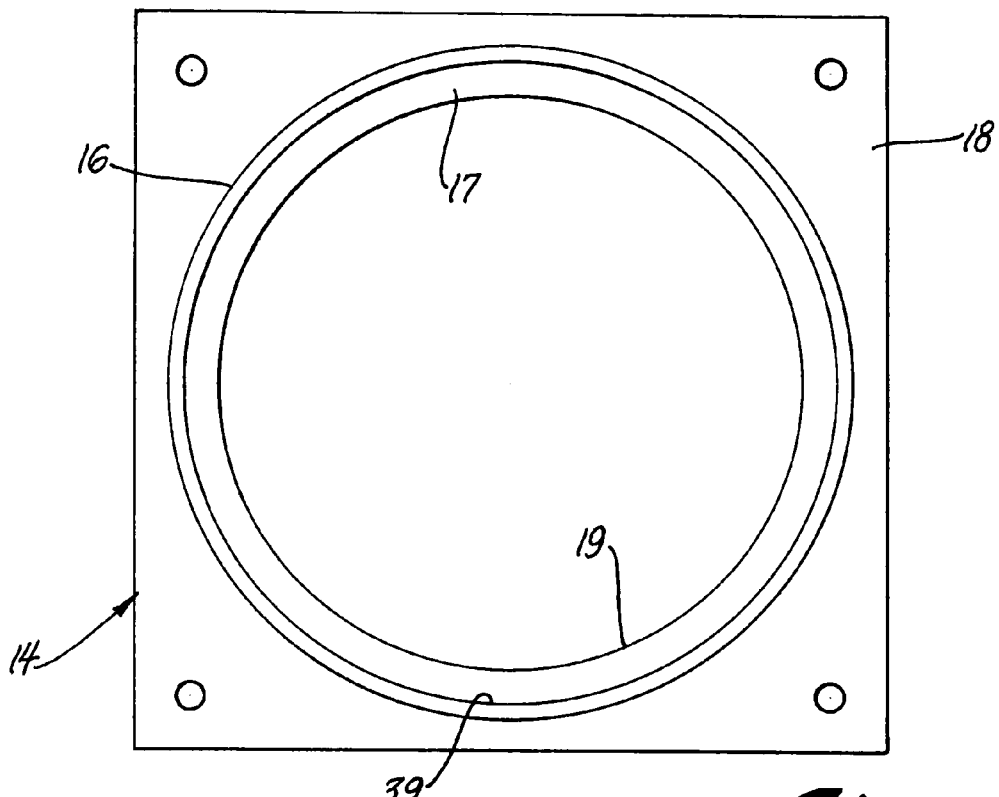
FIG. 2 is an end view of the base housing member of FIG. 1.
Figure 3:
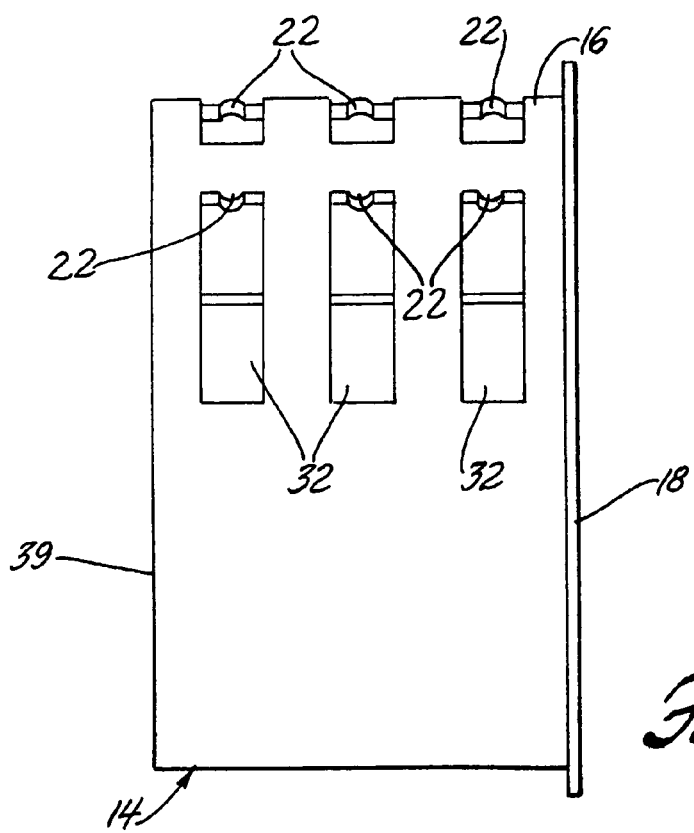
FIG. 3 is a side view of FIG. 2.

With reference to FIGS. 1 through 3, the housing member 14 includes a cylindrical portion 16, having an open end 39, with the opposite end of said portion fixedly attached to rectangular base 18. The rectangular base has an annular resting surface 17 which defines central aperture 19, which is smaller in diameter than cylindrical portion 16. Aperture 19 provides ventilation while surface 17 provides a stop or rest for both socket 42 and driven device 56 within the socket.

Figure 5:
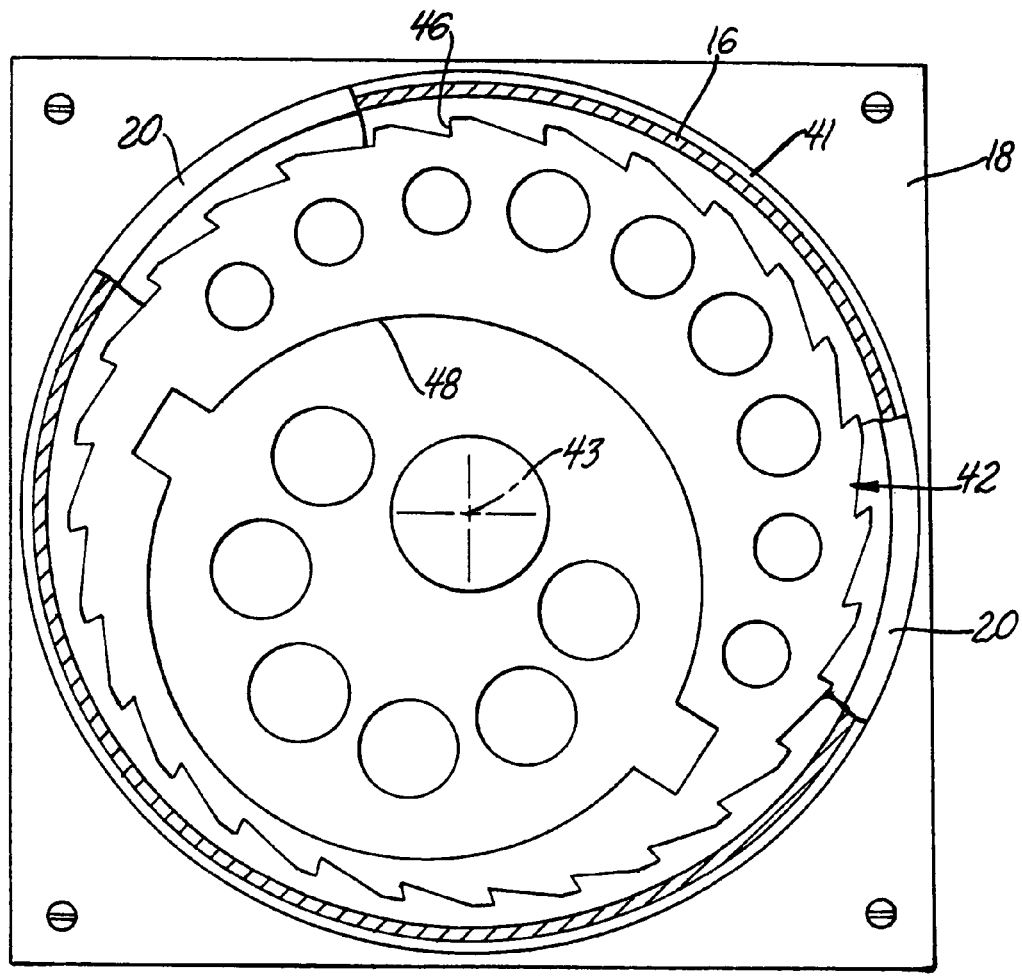
FIG. 5 is an end view of the invention minus the driven device showing elastic bands and gripping pawls holding the socket in a secure, tensioned position.

As seen in FIG. 5, automotive quality elastic bands, as at 41, are placed about the cylindrical portion 16 so as to hold generally arcuate gripping pawls 20 thereon. Pawls 20 define arcuate channels 23 (FIGS. 6 and 7) that accommodate bands 41 and prevent their escape from the pawls. Portion 16 is shown in section in FIG. 5 so that it can be easily distinguished from the bands. Normally, each band will hold a set of two or more concentric, arcuate pawls on cylindrical portion 16 so as to retain the pawls in sets of complementary pawl slots, as at 28, 30 and 32. The complimentary sets of slots and pawls are shown in FIG. 1. Teeth 27 of the pawls (FIGS. 6 and 7) engage tooth-like elements on the outer periphery of socket 42 when the socket is inserted in housing member 14. As with socket 42 it is expected that the pawls will be fashioned of a high-strength, heat-resistant, non-metallic material.

The various pawls and slots in FIG. 1 may be regarded as being in a three-by-three array, where apertures or slots 28 and the associated pawls are in the first row of the array. Slots 30 and their associated pawls are in the second row, and slots 32 and their associated pawls are in the third row. The three slots and pawls most distant from base 18 are in the first column, the next most distant slots and pawls are in the second column, and the slots and pawls closest to base 18 are in the third column. A given elastic band 41 retains pawls of one column in slots of that column.

Pawls 20 can be retained by bands 41 or by a friction fit with their associated slots or by both means. Thus retained, the pawls hold socket 42 in housing member 14 by means of pawl teeth 27, which mesh with or grip the socket's two gear-like annular regions 34 and 36. Each of these regions comprises a multitude of teeth 46. Teeth 46 have flat, relatively more radially oriented faces 45 alternating with relatively less radially oriented slopes 47. Annular regions 34 and 36 are separated by an annular groove 40. As desired for weight reduction or for cooling, socket 42 may be provided with apertures 54, which may be cast, injected, or machined into the socket.

Positioned approximately 60 degrees apart within groove 40 are adjustment holes 44. When socket 42 is within housing member 14, holes 44 align with slots 28, 30 and 32 in the second column in the array described above. Adjustment holes 44 receive tools which turn socket 42 within housing member 14 about its own axis 43 (FIG. 5). Turning the socket clockwise moves device 56 to tighten belt 74 (FIG. 1) due to eccentricity of the socket's receiving aperture 48, which holds the device. The tools used for turning the socket can be very simple, such as a large screwdriver, a pair of pliers, or an elongated rod of about ½ inch in diameter that will fit into adjustment holes 44.

As eccentric socket 42 is turned clockwise with housing member 14, one or more pawls 20 ratchet on each tooth 46. When socket 42 reaches a suitable position, pawl teeth 27 lock with teeth 46. In this position, socket 42 holds device 56 in a placement that maintains belt tension. The pawls may be held in position not only by band 41, but also by friction fit with the pawl slots. The pawls will friction fit within one or more pawl slots 26, 30 or 32, or a combination of these. Ideally each of the gear-like annular regions 34 and 36 will then be held in position by two or more pawls 20 gripping teeth 46.

In practice, not all the pawl slots will be filled by pawls. As little as two gripping pawls 20 are all that is necessary to hold the socket 42 in position as shown in FIG. 5. Some of the pawl slots can be left vacant to facilitate an immediate inspection of the sprocket 42. Likewise, inspection can also be made of electrical or fluid connection elements(s) 52 between device 56 and engine block 68.

Additionally, it may be preferable that the pawl teeth 27 associated with one column not be angularly aligned with the socket 46 teeth of another column. For example, if the ratchet teeth 46 are every 6 degrees and the pawl teeth 27 are every 6 degrees, the first column (See paragraph 0021) will align the pawl teeth with ratchet teeth only every 6 degrees of rotation of the ratchet 42. If, however, the second column is offset by (n×6)+2 degrees (n being an integer to determine the angular offset) and the third column is offset by another +2 degrees, the ratchet 42 teeth will be engaged every 2 degrees by one or another of the three columns. Thus, a three fold finer control of tension of the belts may be achieved.

Figure 6:
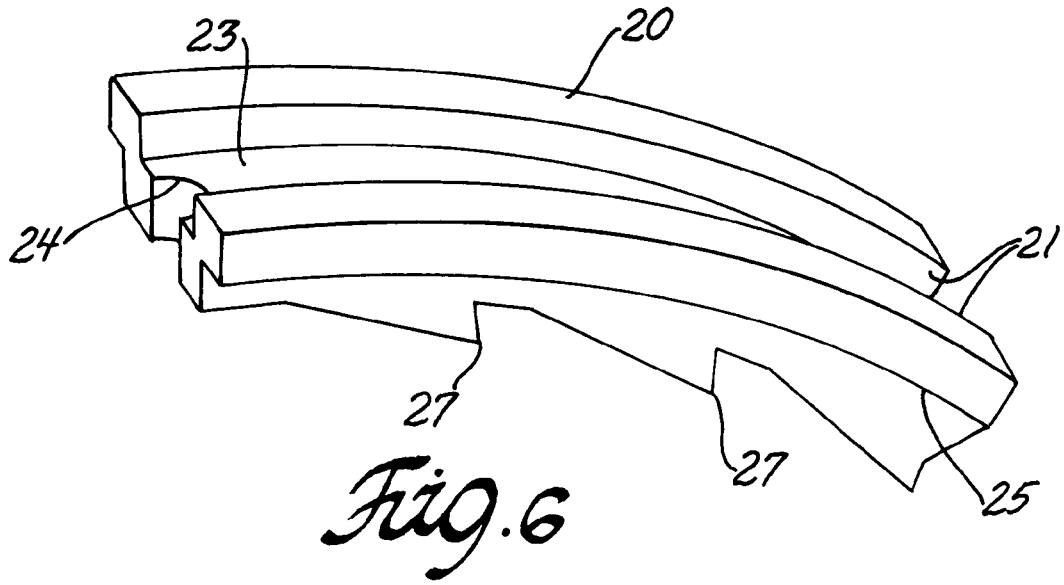
FIGS. 6 and 7 are perspective views showing greater detail of the gripping pawls of this invention.
Figure 7:
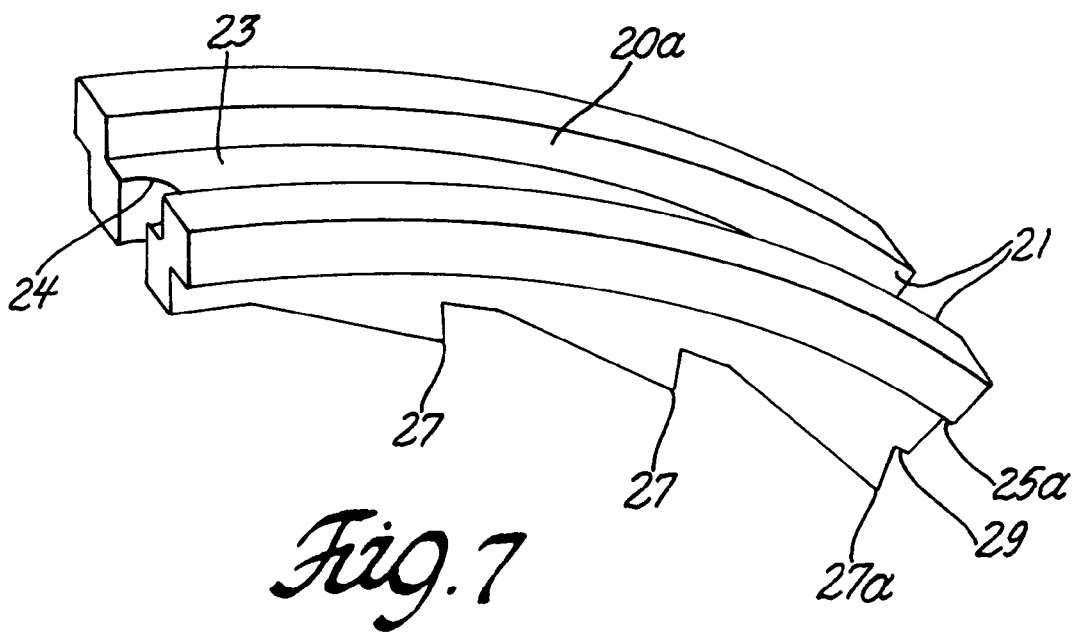

FIG. 6 shows further details of pawl 20 which mates with pawl slots 28, 30 and 32. Pawls 20 have shoulders 21 whose undersides 25 rest on cylindrical housing 16 when the pawls are placed in their slots. Pawls 20 define frontal alignment notches 24, which accommodate tabs 22 of the pawl slots. The notches and tabs prevent the pawls from being placed backwards in the slots. In alternate pawl 20a shown in FIG. 7, shoulder 25 has been extended rearward. This allows the rear of pawl 20a to be rested upon housing 16. Pawl 20a is also modified to provide a pawl ridge 29 on its rear tooth 27a. This ridge allows the pawl tooth to rest at a higher elevation on housing 16 which in turn raises the modified pawl tooth 27a further above the socket 42. This higher elevation will limit any contact with the teeth 46 of socket 42 until pawl 20a is completely placed within a pawl aperture.

Returning to FIG. 1, the pertinent features of the driven device 56 include a driven pulley 58 having cooling means 60 and a threaded mounting aperture 66 bored within one or more lugs 62 for the compatible receipt therein of a screw having complementary threading with aperture 66. Said screw can operate in combination with assorted locking devices and washers that are ordinarily employed to assemble driven devices in the automotive industry.

The main components of the cooling means 60 of driven device 56 include a fan 59 and a plurality of cooling apertures or vents 57. At the rear of the driven device, an electrical output connector element 52 extends for mating with any compatible connector element. Typical connectors are a bayonet, spade, or coaxial connector that will connect to a complementary female acceptor coming from the engine block assembly. The connector mating is conventional and is not shown for simplicity within the drawings. Additionally, the driven device could be a water pump which would require conventional fluid connectors.

I wish it understood that I do not desire to be limited to the exact details of construction or method shown herein since obvious modifications will occur to those skilled in the relevant arts without departing from the spirit and scope of the following claims.

The invention claimed is:

1. For an engine assembly that includes an endless belt and a device on the assembly engaged by the belt, an eccentric mounting and adjustment system for receiving the device and adjusting the position of the device to affect tension of the belt, the system comprising:

a housing member fixed to the engine assembly;
an array of pawl apertures defined by the housing member;
removable pawls on the housing member,
means for retaining the pawls on the housing member with at least one of the removable pawls in a selected one of the pawl apertures;
pawl teeth on the pawls projecting inwardly relative to the housing member;
a socket accepted by the housing member and rotatable therein about a socket axis;
socket teeth on the socket engaged by the pawl teeth;
a receiving aperture defined by the socket for receiving the device; and
means for preventing relative rotation between the socket and the belt driven device;
wherein the receiving aperture is disposed eccentrically relative to the socket axis, whereby rotating the socket moves the device and thereby adjusts tension of the belt.

2. The system of claim 1 wherein the device has a connector element to mate with a fluid connection or an electrical connection to the engine assembly and wherein the system further comprises:

a base of the housing member; and
an accommodation aperture defined by the base for allowing passage of the connector element through the base, the accommodation aperture being smaller than the device, whereby the base retains the device and the socket in the housing member.

3. The system of claim 1 wherein the socket has two sets of the socket teeth, the socket teeth of one set being angularly offset from the socket teeth of the other set.

4. The system of claim 1 wherein first pawl teeth are angularly offset from second pawl teeth.

5. The system of claim 1 wherein the socket defines tool accommodation holes, the accommodation holes registering with selected ones of the pawl apertures.

* * * * *